United States Patent
Komatsu

(10) Patent No.: US 7,359,134 B2
(45) Date of Patent: Apr. 15, 2008

(54) DATA SAVE PROCESSING METHOD FOR DISK STORAGE DEVICE AND DISK STORAGE SYSTEM

(75) Inventor: Masato Komatsu, Higashine (JP)

(73) Assignee: Fujitsu Limited, Kawasaki (JP)

( * ) Notice: Subject to any disclaimer, the term of this patent is extended or adjusted under 35 U.S.C. 154(b) by 116 days.

(21) Appl. No.: 11/299,603

(22) Filed: Dec. 12, 2005

(65) Prior Publication Data

US 2007/0041120 A1    Feb. 22, 2007

(30) Foreign Application Priority Data

Jul. 29, 2005    (JP) ............................. 2005-220834

(51) Int. Cl.
*G11B 15/12* (2006.01)
*G11B 27/36* (2006.01)
*G11B 21/02* (2006.01)

(52) U.S. Cl. ............................. 360/63; 360/31; 360/53; 360/75

(58) Field of Classification Search ................. None
See application file for complete search history.

(56) References Cited

U.S. PATENT DOCUMENTS

| | | | |
|---|---|---|---|
| 6,344,938 B1 * | 2/2002 | Smith | 360/25 |
| 2003/0206358 A1 * | 11/2003 | Loh et al. | 360/31 |
| 2005/0246591 A1 * | 11/2005 | Johnson et al. | 714/47 |

FOREIGN PATENT DOCUMENTS

| | | |
|---|---|---|
| JP | 9-259489 | 10/1997 |
| JP | 10-027436 | 1/1998 |

* cited by examiner

*Primary Examiner*—William Korzuch
*Assistant Examiner*—Jason Olson
(74) *Attorney, Agent, or Firm*—Greer, Burns & Crain, Ltd.

(57) ABSTRACT

A disk storage device has a plurality of disk faces and a plurality of heads. The disk storage device protects the data on the disk face for a head before the defect of the head occurs. For each head, a table for accumulating the error generation count generated by the operation of a head is provided. And a control unit predicts the defect of one head based on the accumulated error generation count, reads data on the corresponding disk face by the head of which the defect was predicted, and writes the read data to another corresponding disk face by another head. Since the defect of a head can be predicted, the data can be protected in advance.

20 Claims, 6 Drawing Sheets

FIG. 10

| ERROR COUNT | ATTRIBUTE VALUE | |
|---|---|---|
| 960-1023 | 61 | |
| 1024-1151 | 60 | |
| 1152-1279 | 59 | |
| 1280-1407 | 58 | |
| 1408-1535 | 57 | |
| 1536-1663 | 56 | |
| 1664-1791 | 55 | |
| 1792-1919 | 54 | ←NEW THRESHOLD |
| 1920-2047 | 53 | |
| 2048-2303 | 52 | |
| 2304-2559 | 51 | |
| 2560-2815 | 50 | |
| 2816-3071 | 49 | |
| 3072-3327 | 48 | |
| 3328-3583 | 47 | |
| 3584-3839 | 46 | ←CURRENT STATUS |
| 3840-4095 | 45 | |
| 4096-4607 | 44 | |
| 4608-5119 | 43 | |
| 5120-5631 | 42 | |
| 5632-6143 | 41 | |
| 6144-6655 | 40 | |
| 6656-7167 | 39 | |

FIG. 11

| | ATTRIBUTE VALUE | OPEN CAPACIT | DATA MOVING CAPACITY FROM HEAD 0 |
|---|---|---|---|
| Head 0 (Fail) | 50 | - | - |
| Head 1 | 95 | 120 | - |
| Head 2 | 85 | 120 | - |
| Head 3 | 100 | 120 | 100 |

FIG. 12

| | ATTRIBUTE VALUE | OPEN CAPACIT | DATA MOVING CAPACITY FROM HEAD 0 |
|---|---|---|---|
| Head 0 (Fail) | 50 | - | - |
| Head 1 | 95 | 80 | 20 |
| Head 2 | 85 | 80 | - |
| Head 3 | 100 | 80 | 80 |

DATA SAVE PROCESSING METHOD FOR DISK STORAGE DEVICE AND DISK STORAGE SYSTEM

CROSS-REFERENCE TO RELATED APPLICATIONS

This application is based upon and claims the benefit of priority from the prior Japanese Patent Application No. 2005-220834, filed on Jul. 29, 2005, the entire contents of which are incorporated herein by reference.

BACKGROUND OF THE INVENTION

1. Field of the Invention

The present invention relates to a data save processing method for a disk storage device which records data on a disk using a head, and the disk storage system, and more particularly to a data save processing method for a disk storage device which predicts the failure of the head and automatically saves the data on the disk face of the head to a disk face of another head, and the disk storage system.

2. Description of the Related Art

Because of recent demands for data computing processing, larger capacities are demanded for medium storage devices for storing data, such as a magnetic disk device and optical disk devices. Therefore the track density and recording density of the disk medium are constantly increasing. Also a decrease in the unnecessary areas of tracks are demanded.

In such a disk device, various preventive measures to protect data are taken for the defects of the head and a storage medium, since data is read/written by the head. For example, the error status is stored in the SMART (Self Monitoring Analysis Report Technology) information within the disk storage device, and this information is notified to the host device when instructed by the host. Based on this SMART information, the host device recognizes the status of the disk device, generates an alarm, and notifies this to the user.

In some cases, a self diagnosis function is provided for the disk device to detect damage of the magnetic head or defects of the storage medium (e.g. Japanese patent Application Laid-open No. H 10-027436 (especially FIG. 1)).

However because of the recent demands for the downsizing of devices, such a disk storage device is also installed in compact servers and mobile equipment (e.g. notebook personal computers, portable AV (Audio/Visual) equipment). Therefore the disk storage device is used in an environment which is vulnerable to the influence of the external environment, such as vibration and temperature change.

In this environment, the heads and the storage devices are especially vulnerable to damage, and require countermeasures. In prior art, however, even if damage to a head is detected, the data on the disk face for the head to read cannot be read, because of the damage to the head, and the data is lost. Since the data capacity on one face of a disk is increasing today, which means that the data volume which could be lost also increases, this problem can no longer be ignored.

In terms of data protection, using a redundant configuration for the disk device by applying RAID technology is one solution, but with this method, where a defect of one head is regarded as a defect of the entire disk device, other non-defective heads cannot be used continuously.

SUMMARY OF THE INVENTION

With the foregoing in view, it is an object of the present invention to provide a data save processing method for a disk storage device and a disk storage system for predicting a defect of one head, protecting the data on the disk face of the head, and continuously using the data.

It is another object of the present invention to provide a data save processing method for a disk storage device and a disk storage system for predicting a defect of one head and automatically saving the data to a disk face of another head.

It is still another object of the present invention to provide a data save processing method for a disk storage device and a disk storage system for predicting a defect of one head based on the error information collected by the disk device, and automatically saving the data on the disk face of the head to a disk face of another head.

It is still another object of the present invention to provide a data save processing method for a disk storage device and a disk storage system for predicting a defect of one head and automatically saving the data on the disk face of the head to a disk face of another head of which the defect probability is low.

To achieve these objects, the present invention is a data save processing method for a disk storage device has at least one disk having a plurality of disk faces, and a plurality of heads disposed for each of the disk faces to read and write data on the corresponding disk face. The method has: a step of accumulating the error generation count generated by the operation of the head for each of the heads; a step of predicting a defect of one of the heads based on the accumulated error generation count; and a data saving step of reading data on the corresponding disk face by the head of which the defect has been predicted, and writing the read data to the other corresponding disk face by the other head.

A disk storage system according to the present invention has: at least one disk having a plurality of disk faces, a plurality of heads disposed for each of the disk faces so as to read and write data on the corresponding disk face; a table for accumulating the error generation count by the operation of the head for each of the heads; and a control unit for predicting the defect of one of the heads based on the accumulated error generation count, reading data on the corresponding disk face by the head of which the defect has been predicted, and writing the read data to the other corresponding disk face by the other head.

In the present invention, it is preferable that the data saving step further has: a step of calculating the moving data capacity on the disk face corresponding to the head of which the defect has been predicted; a step of calculating the open data capacity on the disk face corresponding to the other head; a step of judging whether the moving data capacity is less than the open data capacity; and a step of reading the data on the corresponding disk face by the head of which the defect has been predicted, and writing the read data to the corresponding other disk face by the other head when the moving data capacity is less than the open data capacity.

Also in the present invention, it is preferable that the data saving step further has a step of changing an LBA, for logically specifying a data position on the disk face, from an LBA on the read disk face to an LBA on the written disk face.

Also in the present invention, it is preferable that the judgment step further has a step of judging whether a plurality of other heads, of which the moving data capacity is less than the open data capacity, exist or not, and a step of deciding one other head of which the error generation count is low as a data moving destination head, when a plurality of other heads, of which the moving data capacity is less than the open data capacity, exist.

Also in the present invention, it is preferable that the judgment step further has: a step of judging whether the moving data capacity is less than the total of the open data capacity of the plurality of other heads; a step of deciding one other head of which the error generation count is low as the first data moving destination head, when the moving data capacity is less than the open data capacity; and a step of deciding another head of which the error generation count is the second lowest as the second data moving destination head by detecting by one other head that all of the moving data capacity cannot be stored.

Also in the present invention, it is preferable that the defect prediction step further has a step of predicting the defect of the head by comparing the error generation count with a predetermined threshold value.

Also in the present invention, it is preferable that the data saving step further has a step of issuing a read command to read the LBA on the disk face corresponding to the head of which the defect has been predicted, and a step of issuing a write command to write the read data on the disk face which has been read to a moving destination LBA on the other disk face.

Also in the present invention, it is preferable that the step of calculating the moving data capacity and the open data capacity further has a step of calculating the moving data capacity and the open data capacity on the disk face corresponding to the other head using a table indicating the corresponding LBA range for each of the heads.

Also it is preferable that the present invention further has a step of notifying the accumulated error generation count from the disk device to the host when requested by the host, and a step of issuing a command to predict the defect of the head based on the notified error generation count, read the data on the corresponding disk face from the host to the disk device using the head of which the defect has been predicted, and write the read data to the corresponding other disk face using the other head.

Also it is preferable that the present invention further has a step of suppressing the use of the head of which the defect has been predicted after the data saving step is executed.

According to the present invention, a table for accumulating the error generation count generated by the operation of the head is created for each head, so the defect of one head can be predicted based on the accumulated error generation count. And the data on the corresponding disk face is read by the head of which the defect has been predicted, and the read data is written to the corresponding other disk face by the other head, so the data can be protected in advance.

BRIEF DESCRIPTION OF THE DRAWINGS

FIG. 10 is a table describing the thresholds in FIG. 4 and FIG. 7;

FIG. 11 is a table describing the moving destination head decision processing in FIG. 9; and FIG. 12 is another table describing the moving destination head decision processing in FIG. 9.

DESCRIPTION OF THE PREFERRED EMBODIMENTS

Embodiments of the present invention will now be described in the sequence of the disk storage device, data saving processing and other embodiments.

Disk Storage Device

Figure 1:
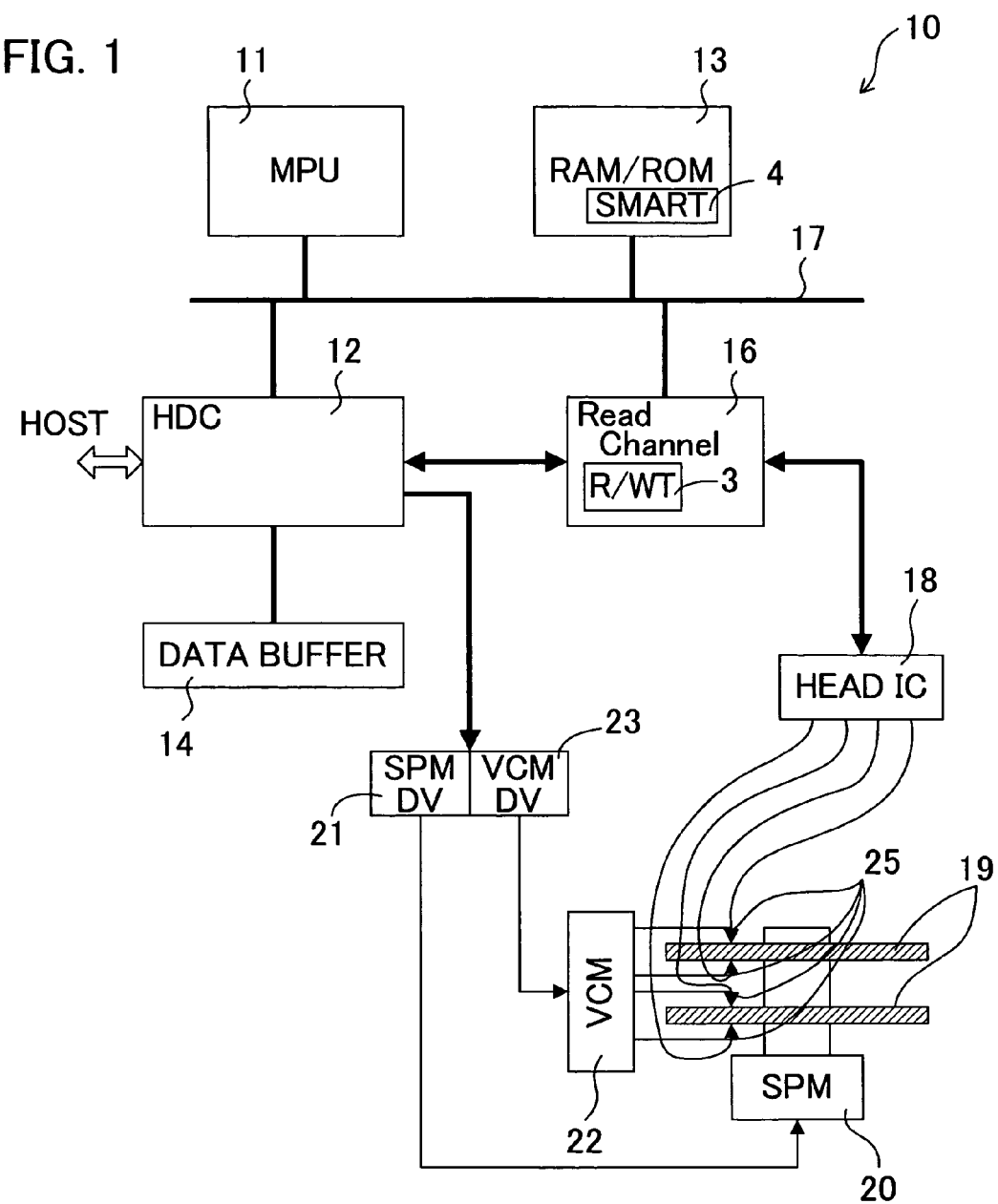
FIG. 1 is a block diagram depicting the disk storage device according to an embodiment of the present invention.
Figure 2:
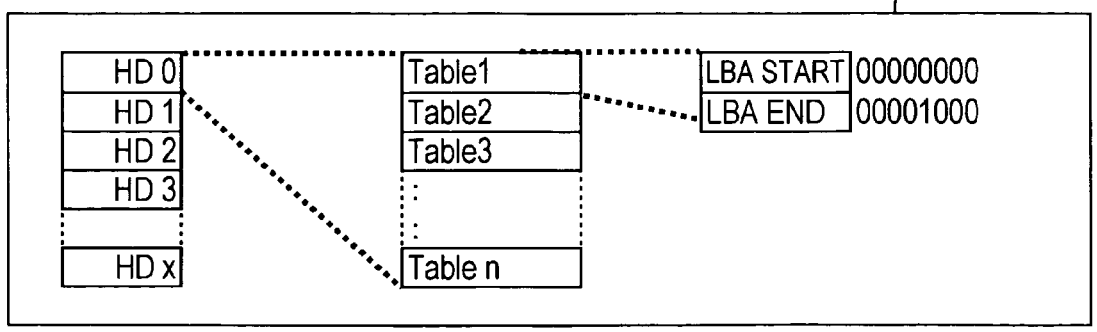
FIG. 2 is a diagram depicting the LBA table in the SMART information in FIG. 1.
Figure 4:
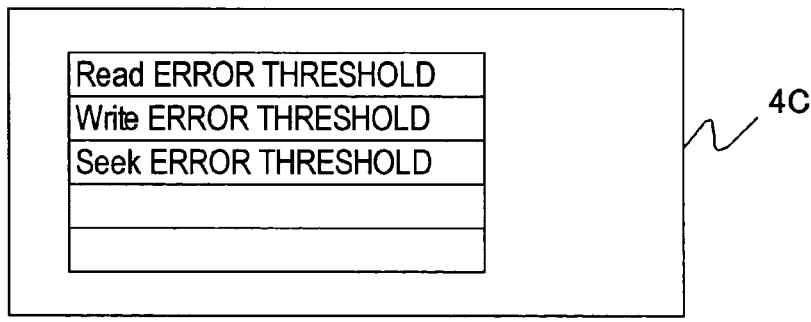
FIG. 4 shows the defective prediction threshold table in the SMART information in FIG. 1.
Figure 5:
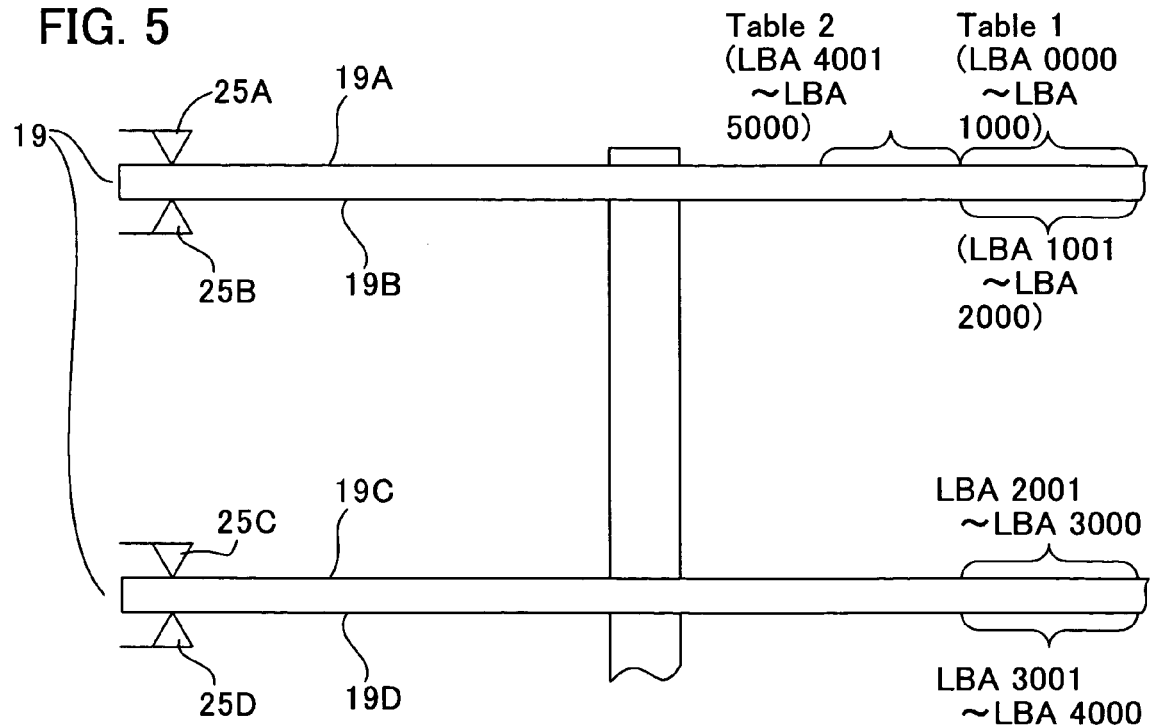
FIG. 5 is a diagram depicting the relationship between the disk, head and LBA in FIG. 1.
Figure 6:
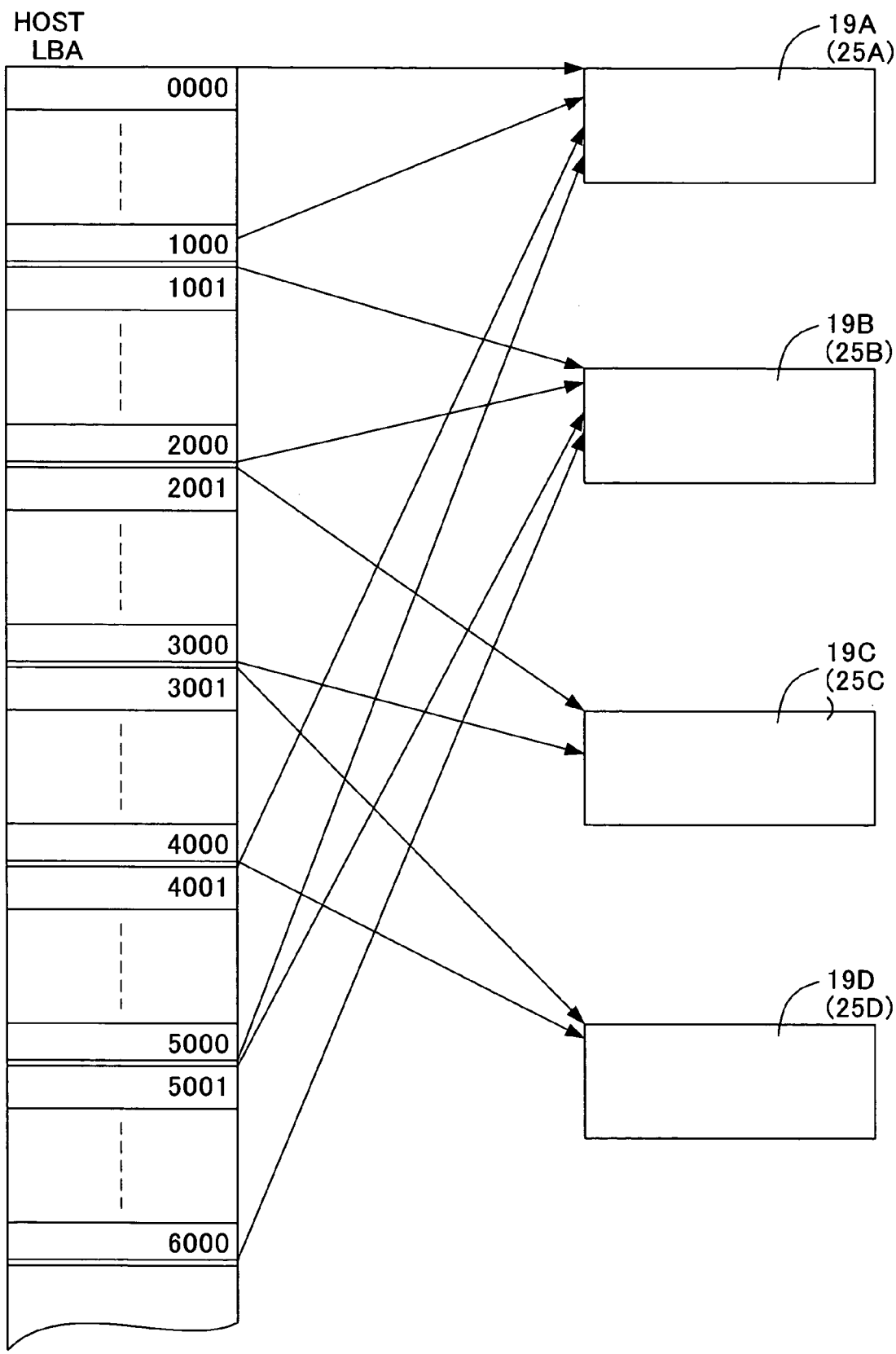
FIG. 6 is a diagram depicting the allocation method of the host LBA to disks in FIG. 1.

FIG. 1 is a block diagram depicting the disk storage device according to an embodiment of the present invention, FIG. 2 and FIG. 4 are diagrams depicting the SMART information in FIG. 1, and FIG. 5 and FIG. 6 are diagrams depicting the host LBA and the data storage positions on the disks. In FIG. 1, a magnetic disk device (HDD) for reading/writing data on the magnetic disk is shown as an example of the disk storage device.

As FIG. 1 shows, the magnetic disk device 10 is internally installed in or is connected to the personal computer (mentioned later in FIG. 7), and is connected with the host (not illustrated in FIG. 1) of the personal computer via a cable (not illustrated) of such an interface as the ATA (AT Attachment) standard.

The magnetic disk device 10 has a plurality (two in this case) of the magnetic disks 19, a spindle motor 20 for rotating the magnetic disks 19, a plurality (four in this case) of magnetic heads 25 for reading/writing data on each face of the magnetic disks 19, and an actuator (VCM) 22 for moving the magnetic heads 25 in the radius direction (track crossing direction) of the magnetic disk 19.

As a control section, the magnetic disk device 10 has an HDC (Hard Disk Controller) 12, data buffer 14, MPU 11, memory (RAM/ROM) 13, read channel circuit 16, head IC 18, spindle motor driver 21, VCM driver 23 and a bus 17 connecting these components.

The HDC 12 further has an interface control circuit having a task file for setting a task from the host, and a data buffer control circuit for controlling the data buffer 14. The read channel circuit 16 demodulates read data and generates write data.

The data buffer 14 plays the function of the cache memory, stores the write data from the host, and stores the read data from the magnetic disk 19. At write back, the HDC 12 writes the write data in the data buffer 14 to the magnetic disk 19, and at read, HDC 12 transfers the read data in the data buffer 14 to the host.

At write the head IC 18 supplies recording current to the magnetic head 25 according to the write data, and at read the head IC 18 amplifies the read signal from the magnetic head 25, and outputs it to the read channel circuit 16. The spindle driver 21 rotary-drives the spindle motor 20. The VCM driver 23 drives the VCM 22 for moving the magnetic head 25.

The MPU (Micro Processing Unit) 11 performs position control, read/write control and retry control of the magnetic head 25. The memory (ROM/RAM) 13 stores data necessary for processing of the MPU 11. A read/write timing circuit 3 is disposed on this read channel circuit 16, and linking with this timing circuit 3 the MPU 11 executes read/write control.

Figure 3:
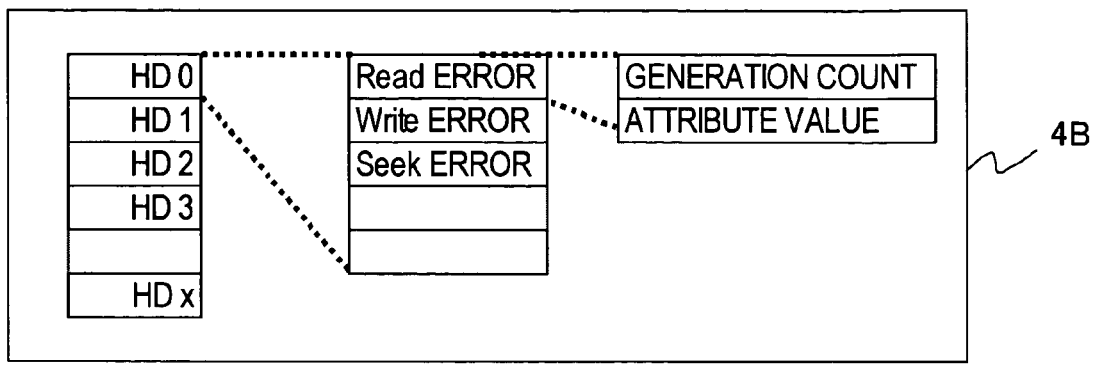
FIG. 3 is a diagram depicting the error generation count accumulation table for each head in the SMART information in FIG. 1.

The SMART information 4 is written in the system area of the magnetic disk 19, and when the device is operating, the SMART information 4 is read from the magnetic disk 19 to the RAM 13. During operation, the SMART information 4 stores the error rate for each the LBA (Logical Block Address), log data, such as the retry count, and the accumulated values thereof. According to an embodiment of the present invention, tables 4A, 4B and 4C, shown in FIG. 2 to FIG. 4, are also created in the SMART information 4.

Table 4A in FIG. 2 shows the head vs. LBA table which defines the range of an LBA, of which each head 25 (HD0-HDn) in the device is in-charge, in table format. Tables Table 1-n of LBA are created for each head HD0-HDn. The start of LBA (LBA START) and the end of LBA (LBA END) are stored in each table, Table 1-n.

For example, as FIG. 5 and FIG. 6 show, a cylinder or notch address format is used in a disk device having a plurality of disk faces and heads. In other words, as FIG. 6 shows, the logical space of the host is defined by LBA, and is continuous. To correspond the data in the logical space with a device having a plurality of heads and disk faces, the logical space must be divided and allocated to each head and disk face.

In this case, if continuous logical block addresses are allocated to the disk face 19A in FIG. 5, up to the full capacity of the disk face, the seek distance of the head may become long, and access time drops.

Therefore as FIG. 5 and FIG. 6 show, the logical space is sub-divided, such as in 1000 LBA units considering the position of the head, and the divided logical space is sequentially allocated to the disk faces 19A, 19B, 19C and 19D. In this example, if LBA0000-LBA1000 are allocated to the disk face 19A, the next LBA 1001-LBA2000, LBA2001-LBA3000 and LBA 3001-LBA4000 are allocated to the continuous space at the same location of the disk faces 19B, 19C and 19D respectively.

In this way, LBA0000-4000 can be continuously accessed by switching the heads, and the seek distance can be decreased. Table 1 in FIG. 2 stores the start of the sub-divided LBA (LBA START) and the end of the LBA (LBA END).

The table in FIG. 3 is the error generation count log table 4B. This table 4B stores the error generation count for each operation and attribute value thereof for each head. For example, the number of generated read errors, write errors and seek errors of each head HD0-HDn and the respective attribute value are stored.

This table 4B is created based on the error information registered for each LBA of the conventional SMART information 4. For example, the table 4A in FIG. 2 is referred to by LBA, and the head number is retrieved, and is converted into the error judgment count of each head. Since making a judgment based on the individual error generation count is complicated, the predetermined number of error generation counts is grouped, and one attribute value is assigned to each group, as described later in FIG. 10.

The table 4C in FIG. 4 shows a threshold table for storing the error threshold of each operation. Here the thresholds of read error, write error and seek error are stored as attribute values. The thresholds are lower than an ordinary error threshold, as described later in FIG. 10. In other words, an ordinary threshold is used to detect an abnormality, but these thresholds of the present invention are used to predict an abnormality.

Using the SMART information 4, including the above mentioned tables 4A, 4B and 4C, the data save operation is performed.

Data Save Processing

Figure 7:
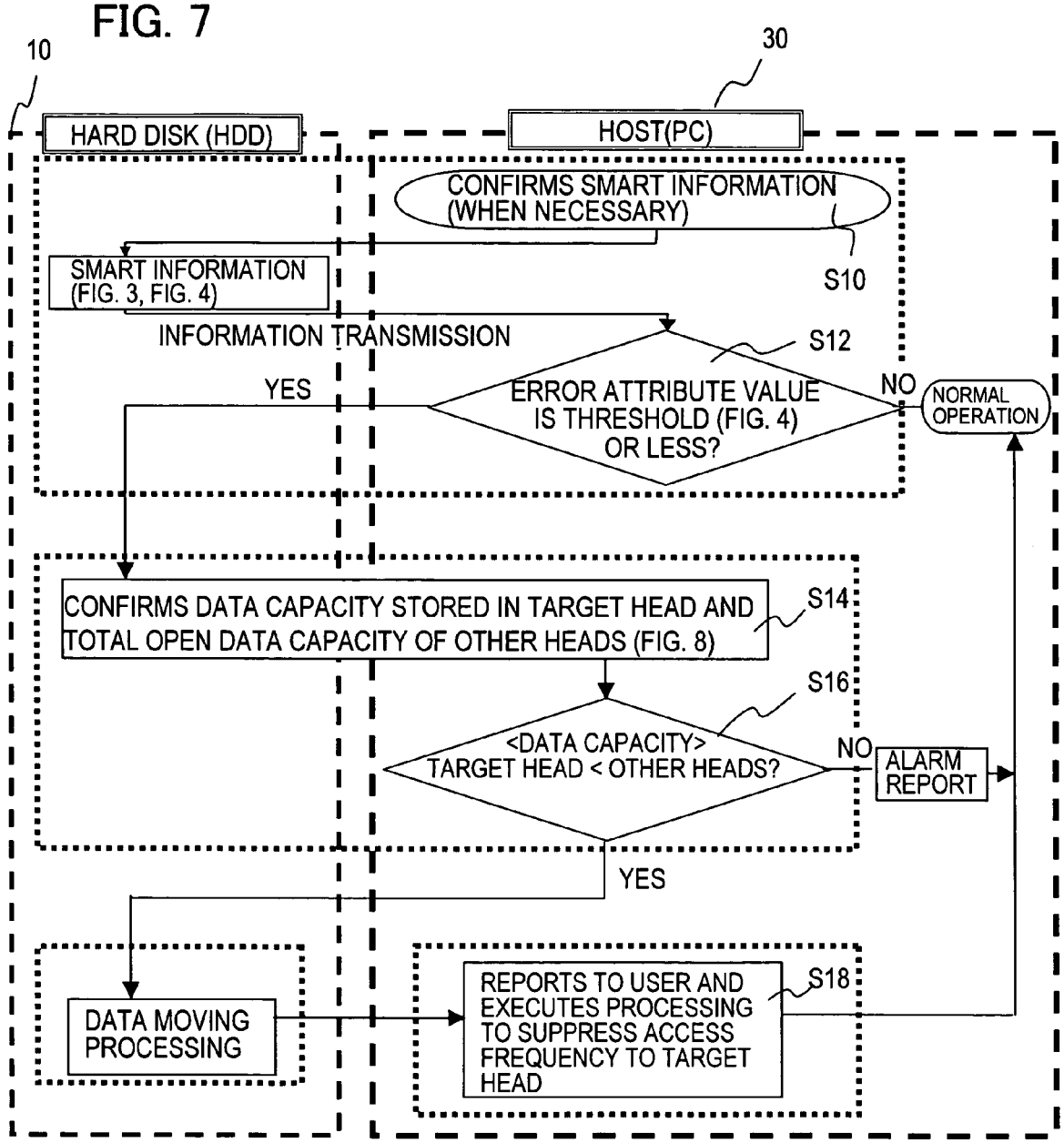
FIG. 7 is a flow chart depicting the save processing according to an embodiment of the present invention.
Figure 8:
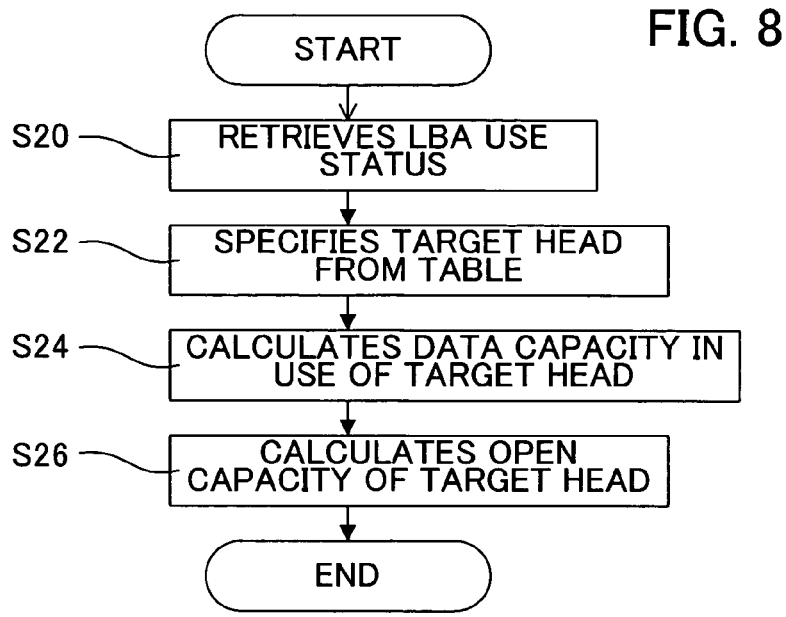
FIG. 8 is a flow chart depicting the moving data capacity and the open data capacity calculation processing in FIG. 7.
Figure 9:
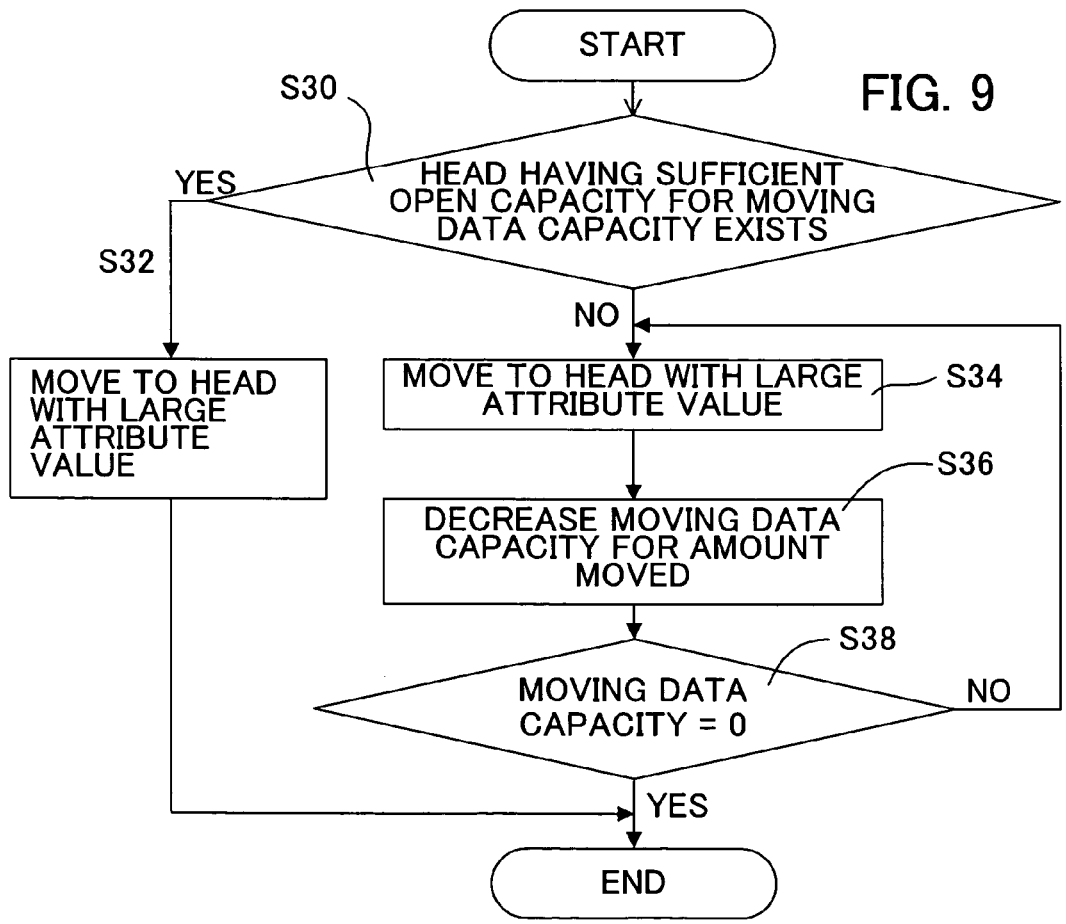
FIG. 9 is a flow chart depicting the moving destination head decision processing in FIG. 7.

FIG. 7 is a flow chart depicting the data save processing according to an embodiment of the present invention, FIG. 8 is a flow chart depicting the open data capacity confirmation processing in FIG. 7, FIG. 9 is a flow chart depicting the data moving processing in FIG. 7, FIG. 10 is a table describing the head abnormality prediction in FIG. 7, and FIG. 11 and FIG. 12 are tables depicting the data moving processing.

The data save processing in FIG. 7 will be described with reference to FIG. 10.

(S10) The disk storage device 10 is connected to the host (PC: Personal Computer) 30. The host 30 reads the SMART information 4 of the disk storage device 10 at an appropriate time (e.g. every predetermined time, each time processing ends).

(S12) The host 30 retrieves the error count table 4B and the error threshold table 4C in FIG. 3 and FIG. 4 in the read SMART information 4. In the case of a read error, for example, an attribute value is assigned to a read error count, and the attribute value increases as the read error count decreases, as shown in FIG. 10. As mentioned above, in these attribute values, the threshold of the error threshold table 4C (called defect prediction threshold) is greater than the threshold of ordinary abnormality detection, since the purpose of this is to predict the defect of a head. The host 30 judges whether the read error attribute value of each head of the table 4B is less than the threshold (attribute value) of the table 4C. As mentioned above, the attribute value increases as the read error count decreases, so if the attribute values of the read error of all the heads of the table 4B are not less than the threshold (attribute value) of the table 4C, this is judged that no head defect has occurred, and normal operation is executed continuously.

(S14) If an attribute value of the read error of any head in the table 4B is less than the threshold (attribute value) of the table 4C, this is judged that a defect may occur to the head, and data save processing is executed. First the data capacity stored on the disk face of the target head is calculated, and the total open data capacity of the other heads is calculated. This processing will be described later in FIG. 8.

(S16) The host 30 judges whether the data capacity stored on the disk face of the target head is less than the total open data capacity of the other heads. If the data capacity stored on the disk face of the target head is not less than the total open data capacity of the other heads, an alarm is reported since the data cannot be saved, and normal operation is continued. If the data capacity stored on the disk face of the target head is less than the total open data capacity of the other heads, the data can be saved, so the data moving destination head, which will be described in FIG. 9, is determined, and the data moving to the moving destination head is instructed to the disk storage device 10. By this the disk storage device 10 reads the data on the disk face corresponding to the target head, stores it in the memory, then writes the read data on the corresponding disk face using the moving destination head.

(S18) when a data moving completion notice is received from the disk storage device 10, the host 30 changes the LBA of the moving data in the logical space to the moving destination, and notifies it to the user. And the host 30 performs processing to suppress the access frequency to the target head. For example, the disk faces of the other heads are used with priority, and only when the disk faces of the other heads become full and the data still need be stored, access to the target head is permitted. And normal operation is continued.

In this way, the disk storage device 10 holds the error generation count of each head, predicts the defect of a head based on this error generation count, and data on the disk face of this head is saved to the disk face of another head, which is not defective, before a complete defect status occurs. Therefore the data in the disk storage device can be protected, and the device can be used continuously.

Also the thresholds are set in the disk storage device 10, so the host can implement this function merely by installing the data save program, without having any status information. In other words, the host can have the data protection function merely by installing the data save program.

Also the LBA allocation table of each head is created in the disk storage device 10, so the host can easily decide on a data save destination head.

Now the data moving capacity and the open capacity calculation processing in FIG. 7 will be described with reference to FIG. 8.

(S20) The host 30 retrieves the LBA use status (use range) in the host logical space from the directory of the host logical space described in FIG. 6.

(S22) The host 30 specifies each head being used in the LBA use range, referring to the above mentioned head vs. LBA table 4A in FIG. 3.

(S24) Then from information on each head, data capacity used by the target head of which a defect was predicted is calculated from the LBA use range of this target head.

(S26) Then the LBA use data capacity of the heads, other than the head of which a defect was predicted, is calculated, the calculated LBA use data capacity is subtracted from the user data capacity of the head (disk face), and the open capacity of the heads (disk faces), other than the head of which a defect was predicted, is calculated. For example, the open capacity table, such as FIG. 11 and FIG. 12, is acquired.

Now the data save processing in FIG. 7 will be described using FIG. 9, with reference to FIG. 10 and FIG. 11.

(S30) The data capacity, used by each of the heads other than the head of which a defect was predicted, calculated in FIG. 8 (data moving capacity) and the open capacity of each head are compared, and a moving destination head is determined. For example, if the data moving capacity is 100 kBytes, this is compared with the open capacity of each head shown in FIG. 11 and FIG. 12.

(S32) If it is judged that one head has an open space sufficient for the data moving capacity, then that head is decided as the moving destination candidate head. If there is only one moving destination candidate head, that moving destination candidate head is decided as the moving destination head. If there are a plurality of moving destination candidate heads, as shown in FIG. 11 (heads 1, 2, 3 in FIG. 11), the attribute values of these heads are read from the table 4B, and a head with a high attribute value (with a low error generation count, as shown in FIG. 10) (head 3 in FIG. 11) is selected as the moving destination head. In other words, by moving the data to a head with a low error generation probability, the generation of an error during the next and later read operations can be minimized, and a data save to a potential head, of which a defect is predicted next, can be prevented. Then this processing ends.

(S34) If it is judged that any head alone cannot have an open capacity sufficient for the data moving capacity, then all the heads which have open capacity and of which a defect was not predicted are regarded as the moving destination candidate heads, and the attribute values of the heads are read from the table 4B. The head with a high attribute value (with a low error generation count, as shown in FIG. 10) (head 3 in FIG. 12) is selected as a moving destination head. In other words, by moving the data to a head with a low error generation probability, the generation of an error during the next and later read operations can be minimized, and a data save to a potential head, of which a defect is predicted next, can be prevented.

(S36) Then the host 30 subtracts the open capacity of this moving destination head from the data moving capacity, and updates the data moving capacity.

(S38) The host 30 judges whether the updated data moving capacity is "0". If the data moving capacity is not "0", the processing returns to step S34, and a head, of which the attribute value is second highest, is decided to be the moving destination head. If the updated data moving capacity is "0", the moving destination head deciding processing ends.

After deciding the moving destination heads, the host 30 issues a data read command for reading the moving source head (head of which a defect was predicted), and a data write command for writing the moving destination heads to the disk storage device 10.

In this way, the moving destination is selected to be a head with a high attribute value (with a low error generation count, as shown in FIG. 10), and the data is moved there, so the generation of an error during the next and later read operations can be minimized, and a data save to a potential head, of which a defect is predicted next, can be prevented.

Other Embodiments

In the above mentioned embodiment, the disk storage device was described using a magnetic disk device, but the present invention can also be applied to other storage media, such as an optical disk and magneto-optical disk. The interface is not limited to ATA, but can be applied to other interfaces. Also a disk device with four disk faces was described, but the present invention can also be applied to other devices having a plurality of disk faces, such as a disk device with two disk faces.

The host 30 calculates the data moving capacity and the open capacity, and decides the data save destination head in the above embodiment, but this processing may be executed by a disk device which manages the data use capacity of each head. In this case, the logical space of the host is operated, so the possibility of a data save processing and information on the data save destination LBA are notified to the host.

The present invention was described above using embodiments, but the present invention can be modified in various ways within the scope of the essential character of the present invention, and these shall not be excluded from the scope of the present invention.

Since a table for accumulating the error generation count generated by the operation of the head is created for each head, a defect of one head can be predicted based on the accumulated error generation count. And the data on the corresponding disk face is read by the head of which a defect was predicted, and the read data is written to the other corresponding disk face by the other head, so data can be protected in advance, and the reliability of the disk storage devices improves.

What is claimed is:

1. A data save processing method for a disk storage device comprising at least one disk having a plurality of disk faces, and a plurality of heads disposed for each of the disk faces to read and write data on the corresponding disk face, comprising:
    a step of accumulating an error generation count generated by at least one of read and write operation of the head for each of the heads;
    a step of predicting a defect of one of the heads based on an accumulated error generation count; and
    a data saving step of reading data on the corresponding disk face by the head of which the defect has been predicted, and writing read data to the other corresponding disk face by the other head which did not predict the defect by said accumulated error generation count.

2. The data save processing method for a disk device according to claim 1, wherein the data saving step further comprises:
    a step of calculating a moving data capacity on the disk face corresponding to the head of which the defect has been predicted;
    a step of calculating an open data capacity on the disk face corresponding to the other head;
    a step of judging whether the moving data capacity is less than the open data capacity; and
    a step of reading data on the corresponding disk face by the head of which the defect has been predicted, and writing the read data to the corresponding other disk face by the other head when the moving data capacity is less than the open data capacity.

3. The data save processing method for a disk device according to claim 1,
    wherein the data saving step further comprises a step of changing a Logical Block Address (LBA) for logically specifying a data position on the disk face from an LBA on the read disk face to an LBA on the written disk face.

4. The data save processing method for a disk device according to claim 2, wherein the judgment step further comprises:
    a step of judging whether a plurality of other heads of which the moving data capacity is less than the open data capacity exist or not; and
    a step of deciding one other head of which the error generation count is low as a data moving destination head, when a plurality of other heads, of which the moving data capacity is less than the open data capacity, exist.

5. The data save processing method for a disk device according to claim 2, wherein the judgment step further comprises:
    the step of judging whether the moving data capacity is less than the total of the open data capacity of the plurality of other heads;
    a step of deciding one other head of which the error generation count is low as a first data moving destination head when the moving data capacity is less than the open data capacity; and
    a step of deciding another head of which the error generation count is the second lowest as a second data moving destination head by detecting by the one other head that all of the moving data capacity cannot be stored.

6. The data save processing method for a disk device according to claim 1,
    wherein the defect prediction step further comprises a step of predicting the defect of the head by comparing the error generation count with a predetermined threshold value.

7. The data save processing method for a disk device according to claim 3, wherein the data saving step further comprises:
    a step of issuing a read command to read the LBA on the disk face corresponding to the head of which the defect has been predicted; and
    a step of issuing a write command to write the read data on the disk face which has been read to a moving destination LBA on the other disk face.

8. The data save processing method for a disk device according to claim 2,
    wherein the step of calculating the moving data capacity and the open data capacity further comprises a step of calculating the moving data capacity and the open data capacity on the disk face corresponding to the other head using a table indicating the corresponding Logical Block Address (LBA) range for each of the heads.

9. The data save processing method for a disk device according to claim 1, further comprising:
    a step of notifying the accumulated error generation count from the disk device to a host when requested by the host; and
    a step of issuing a command to read data on the corresponding disk face using the head of which the defect was predicted, and write the read data to the corresponding other disk using the other head from the host to the disk device by predicting the defect of the head based on the notified error generation count on the host.

10. The data save processing method for a disk device according to claim 1, further comprising a step of suppressing use of the head of which the defect has been predicted after the data saving step is executed.

11. A disk storage system, comprising:
    at least one disk having a plurality of disk faces;
    a plurality of heads disposed for each of the disk faces to read and write data on the corresponding disk face;
    a table for accumulating an error generation count generated by at least one of read and write operation of the head for each of the heads; and
    a control unit for predicting a defect of one of the heads based on an accumulated error generation count, reading data on the corresponding disk face by the head of which the defect has been predicted, and writing the read data to the other corresponding disk face by the other head which did not predict the defect by said accumulated error generation count.

12. The disk storage system according to claim 11,
    wherein the control unit calculates a moving data capacity on the disk face corresponding to the head of which the defect has been predicted and an open data capacity on the disk face corresponding to the other head, judges whether the moving data capacity is less than the open data capacity, and reads data on the corresponding disk face by
    the head of which the defect has been predicted and writes the read data to the corresponding other disk face by the other head when the moving data capacity is less than the open data capacity.

13. The disk storage system according to claim 11,
    wherein the control unit changing a Logical Block Address (LBA) for logically specifying a data position on the disk face from an LBA on the read disk face to an LBA on the written disk face.

14. The disk storage system according to claim 12, wherein the control unit judges whether a plurality of other heads of which the moving data capacity is less than the open data capacity exist or not, and decides one other head of which the error generation count is low as a data moving destination head, when a plurality of other heads of which the moving data capacity is less than the open data capacity.

15. The disk storage system according to claim 12, wherein the control unit judges whether the moving data capacity is less than a total of the open data capacity of the plurality of other heads, decides one other head of which the error generation count is low as a first data moving destination head when the moving data capacity is less than the open data capacity, and decides another head of which the error generation count is the second lowest as a second data moving destination head by detecting by the one other head that all of the moving data capacity cannot be stored.

16. The disk storage system according to claim 11, wherein the control unit predicts the defect of the head by comparing the error generation count with a predetermined threshold value.

17. The disk storage system according to claim 13, wherein the control unit issues a read command to read the LBA on the disk face corresponding to the head of which the defect has been predicted, and issues a write command to write the read data on the disk face which has been read to a moving destination LBA on the other disk face.

18. The disk storage system according to claim 12, wherein the control unit calculates the moving data capacity and open data capacity on the disk face corresponding to the other head using a table indicating the corresponding Logical Block Address (LBA) range for each of the heads.

19. The disk storage system according to claim 11, wherein the control unit further comprises:

a control unit for a disk storage device having a table on the accumulated error generation count; and a host connected to the disk storage for requesting transferring the table to a disk storage device, and wherein the host predicts the defect of the head based on the transferred error generation count, and issues a command to read the data on the corresponding disk face using the head of which the defect has been predicted, and to write the read data to the corresponding other disk face using the other head.

20. The disk storage system according to claim 19, wherein the host suppresses the use of the head of which the defect has been predicted after the data save is executed.

* * * * *